US012689154B2

(12) United States Patent
Hennrich et al.

(10) Patent No.: US 12,689,154 B2
(45) Date of Patent: Jul. 21, 2026

(54) ELECTRICAL RECEPTACLE LOCKING SYSTEM

(71) Applicant: Chatsworth Products, Inc., Georgetown, TX (US)

(72) Inventors: Preston E. Hennrich, Leander, TX (US); Wade A. Much, Hutto, TX (US)

(73) Assignee: Chatsworth Products, Inc., Georgetown, TX (US)

( * ) Notice: Subject to any disclaimer, the term of this patent is extended or adjusted under 35 U.S.C. 154(b) by 238 days.

(21) Appl. No.: 18/228,579

(22) Filed: Jul. 31, 2023

(65) Prior Publication Data

US 2025/0047035 A1 Feb. 6, 2025

(51) Int. Cl.

| | |
|---|---|
| ***H01R 13/62*** | (2006.01) |
| ***H01R 13/627*** | (2006.01) |
| ***H01R 13/629*** | (2006.01) |
| ***H01R 25/00*** | (2006.01) |

(52) U.S. Cl.

CPC ... *H01R 13/62966* (2013.01); *H01R 13/6273* (2013.01); *H01R 25/00* (2013.01)

(58) Field of Classification Search

None

See application file for complete search history.

(56) References Cited

U.S. PATENT DOCUMENTS

| | | | | |
|---|---|---|---|---|
| 6,782,617 B2 * | 8/2004 | Pulizzi | H01R 13/743 29/842 |
| 6,935,880 B1 * | 8/2005 | Su | H01R 13/639 439/218 |

* cited by examiner

*Primary Examiner* — Ross N Gushi

(74) *Attorney, Agent, or Firm* — Snell & Wilmer LLP

(57) ABSTRACT

A power distribution unit (PDU) includes a housing, a power input extended from the housing, and at least one electrical receptacle removably attached to the housing and configured to be electrically connected to the power input. The at least one electrical receptacle can include a base surface and an inner core extended from the base surface. The inner core can include an outer surface configured to mate with a first connector type. An outer wall can be positioned around the inner core, the outer wall including an inner surface configured to receive a connector type. The outer wall can include a first end and a second end each positioned on a common side. A locking mechanism can be extended between the first and second ends, the locking mechanism including a locking catch arm configured to pivot and engage with a shoulder of an electrical plug.

15 Claims, 15 Drawing Sheets

ELECTRICAL RECEPTACLE LOCKING SYSTEM

FIELD

The present disclosure is directed to power distribution units incorporating one or more receptacles having one or more locking mechanisms.

BACKGROUND

Power distribution units (PDUs) are understood as being a plurality of receptacles that receive and distribute power to appliances connected to a respective receptacle. Most often, PDUs have power inputs (e.g., a plug) that can connect to external power (e.g., AC power). PDUs have many different uses, including with electronic equipment racks such as in computing facilities, data centers, cloud computing centers, and the like. In such facilities, multiple PDUs may be used at once whereby the PDUs may be selectively arranged with many components attached (and corresponding component wiring).

It is with respect to these and other considerations to secure PDUs and connected equipment that the various embodiments described below are presented.

SUMMARY

Embodiments of the present disclosure include a power distribution unit (PDU). The PDU can include a housing, a power input extended from the housing, and at least one electrical receptacle removably attached to the housing and configured to be electrically connected to the power input. The at least one electrical receptacle can include a base surface and an inner core extended from the base surface. The inner core can include an outer surface configured to mate with a first connector type. An outer wall can be positioned around the inner core, the outer wall including an inner surface configured to receive a connector type. The outer wall can include a first end and a second end each positioned on a common side. A locking mechanism can be extended between the first and second ends, the locking mechanism including a locking catch arm configured to pivot about a common axis of the first and second ends and engage with a shoulder of an electrical plug when connected to the inner core.

In some aspects, the locking catch arm extends between the first and second ends above a flange that at least partially surrounds the outer wall. The locking mechanism can include a first spring arm pivotably connected to the common axis and extended from the locking catch arm to the common axis along the outer surface of the first end. A second spring arm can be pivotably connected to the common axis and extended from the locking catch arm to the common axis along the outer surface of the second end.

In some aspects, the flange includes a rear portion with a break between a forward portion, the first and second spring arms each extended through the break between the rear and forward portions of the flange.

In some aspects, each spring arm includes a retention edge extended radially outward to securely attach the electrical receptacle to an upper surface of the housing.

In some aspects, a flange at least partially surrounds the outer wall, the outer wall including an upper portion extended upward from the flange and a lower portion extended from the flange to the base surface. At least one notched window is in the upper portion of the outer wall, the at least one notched window configured to receive a bezel including a label display.

In some aspects, the bezel includes a first edge orthogonal with respect to a second edge, the bezel including at least one inwardly angled connector configured to snap on and attach with the at least notched window.

In some aspects, the bezel includes at least one alignment tab configured to removably guide attachment of the bezel to an upper edge of the upper portion of the outer wall, the at least one alignment tab downward from an upper planar surface of the bezel.

In some aspects, the base surface, the inner core, and the outer wall are formed together as a single molded piece.

In some aspects, the inner core includes an upper surface with a plurality of apertures configured to receive the electrical plug.

In some aspects, the plurality of apertures are configured as an IEC C13 core.

In some aspects, the plurality of apertures are configured as an IEC C19 core.

In some aspects, the plurality of apertures are configured as an IEC C15 core, an IEC 21 core, as well as other cores.

In some aspects, the plurality of apertures are configured as a combination connector core (e.g., IEC C13 core and IEC C19 core), wherein the plurality of apertures are T-shaped.

In some aspects, a plurality of terminals are included each electrically connected to a circuit board within the housing, each terminal positioned in a corresponding one of the apertures, wherein the circuit board is electrically connected to the power input. In some aspects, a plurality of terminals are included each electrically connected to discrete internal power wiring of the housing.

In some aspects, a housing latch is included and movable between a locked state and an unlocked state with respect to an aperture of an upper surface of the housing, the housing latch extended through at least one window of the outer wall between the inner surface and an outer surface.

In some aspects, a kit is disclosed that includes any power distribution unit of this disclosure. The kit includes a plurality of bezels configured to be removably attached to an upper edge of the upper portion of the outer wall and the at least one notched window, wherein each bezel includes a different visual and/or tactile identifier, each different visual and/or tactile identifier including at least one of an identifying color, label, molded shape, motif, and character.

In some aspects, an electrical receptacle is disclosed and configured to be removably attached to a housing of a power distribution unit. The electrical receptacle can include an inner core extended from a base surface and including an outer surface configured to mate with an electrical connector type. An outer wall is positioned around the inner core, wherein the outer wall including an inner surface configured to receive a connector type, the outer wall including a first end and a second end each positioned on a common side. A locking mechanism is extended between the first and second ends, the locking mechanism including a locking catch arm configured to pivot about a common axis of the first and second ends and engage with a shoulder of an electrical plug when connected to the inner core.

In some aspects, the locking catch arm extends between the first and second ends above a flange that at least partially surrounds the outer wall. The locking mechanism includes a first spring arm pivotably connected to the common axis and extended from the locking catch arm to the common axis along the outer surface of the first end. A second spring arm is pivotably connected to the common axis and extended from the locking catch arm to the common axis along the outer surface of the second end.

In some aspects, the flange includes a rear portion with a break between a forward portion, the first and second spring arms each extended through the break between the rear and forward portions of the flange.

In some aspects, each spring arm includes a retention edge extended radially outward to securely attach the at least one electrical receptacle to an upper surface of the housing.

In some aspects, a flange at least partially surrounds the outer wall, the outer wall including an upper portion extended upward from the flange and a lower portion extended from the flange to the base surface. At least one notched window is in the upper portion of the outer wall, the at least one notched window configured to receive a bezel including a label display.

In some aspects, the bezel includes a first edge orthogonal with respect to a second edge, the bezel including at least one inwardly angled connector configured to snap on and attach with the at least notched window.

In some aspects, the bezel includes at least one alignment tab configured to removably guide attachment of the bezel to an upper edge of the upper portion of the outer wall, the at least one alignment tab downward from an upper planar surface of the bezel.

In some aspects, the base surface, the inner core, and the outer wall are formed together as a single molded piece.

In some aspects, the inner core includes an upper surface with a plurality of apertures configured to receive the electrical plug.

In some aspects, an electrical receptacle is configured to be removably attached to a housing of a power distribution unit. The electrical receptacle can includes a base surface and a plurality of cores extended from the base surface. The cores includes an outer surface configured to mate with an electrical connector type. An isolation wall extends upwards and away from the base surface between adjacent cores of the plurality of cores. An outer wall can be positioned around the plurality of cores, the outer wall including an inner surface configured to receive an electrical connector type. The outer wall includes a first end and a second end each positioned on a common side. A locking mechanism is extended between the first and second ends, the locking mechanism including a locking catch arm configured to pivot about a common axis of the first and second ends and engage with a shoulder of an electrical plug when connected to at least one core of the plurality of cores.

In some aspects, at least one core of the plurality of cores includes an upper surface with a plurality of T-shaped apertures configured to receive a plurality of electrical plug connector types.

In some aspects, the locking catch arm extends between the first and second ends above a flange that at least partially surrounds the outer wall. The locking mechanism can include a first spring arm pivotably connected to the common axis and extended from the locking catch arm to the common axis along the outer surface of the first end. A second spring arm is pivotably connected to the common axis and extended from the locking catch arm to the common axis along the outer surface of the second end.

In some aspects, the flange includes a rear portion with a break between a forward portion, the first and second spring arms each extended through the break between the rear and forward portions of the flange.

In some aspects, each spring arm includes a retention edge extended radially outward to receive a flange of the electrical plug when the electrical plug is connected to the electrical receptacle.

In some aspects, a flange at least partially surrounds the outer wall, the outer wall including an upper portion extended upward from the flange and a lower portion extended from the flange to the base surface. At least one notched window is in the upper portion of the outer wall, the at least one notched window configured to receive a bezel including a label display.

In some aspects, the bezel includes a first edge orthogonal with respect to a second edge, the bezel including at least one inwardly angled connector configured to snap on and attach with the at least notched window.

In some aspects, the bezel includes at least one alignment tab configured to removably guide attachment of the bezel to an upper edge of the upper portion of the outer wall, the at least one alignment tab downward from an upper planar surface of the bezel.

In some aspects, the base surface, the inner core, and the outer wall are formed together as a single molded piece.

In some aspects, the inner core includes an upper surface with a plurality of apertures configured to receive the electrical plug.

In some aspects, a locking mechanism is disclosed for an electrical receptacle that removably attaches to a housing of a power distribution unit. The locking mechanism includes a first end opposite a second end of an outer wall. A locking catch arm is included that is configured to pivot about a common axis of the first and second ends and engage with a shoulder of an electrical plug when connected to an inner core of the electrical receptacle.

Other aspects and features of the present disclosure will become apparent to those of ordinary skill in the art, upon reviewing the following detailed description in conjunction with the accompanying figures.

BRIEF DESCRIPTION OF THE FIGURES

The above and further aspects of this disclosure are further discussed with reference to the following description in conjunction with the accompanying drawings, in which like numerals indicate like structural elements and features in various figures. The drawings are not necessarily to scale, emphasis instead being placed upon illustrating principles of the invention. The figures depict one or more implementations of the inventive devices, by way of example only, not by way of limitation.

DETAILED DESCRIPTION

This description provides examples, and is not intended to unnecessarily limit the scope, applicability or configuration of the solution of this disclosure. Rather, the ensuing description will provide those skilled in the art with an enabling description for implementing embodiments of the solution. Various changes may be made in the function and arrangement of elements. Thus, various embodiments may omit, substitute, and/or add various procedures or components as appropriate. For instance, aspects and elements described with respect to certain embodiments may be combined in various other embodiments. It should also be appreciated that the following systems, devices, and components may individually or collectively be components of a larger system, wherein other procedures may take precedence over or otherwise modify their application.

In the description herein, numerous specific details are set forth. However, it is to be understood that embodiments of the present disclosure may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the present disclosure so described may include a particular feature, structure, or characteristic, but not every embodiment necessarily includes the particular feature, structure, or characteristic. Further, repeated use of the phrase "in one embodiment" does not necessarily refer to the same embodiment, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form. Accordingly, "a receptacle" or "the receptacle" may refer to one or more receptacles where applicable.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Figure 1:
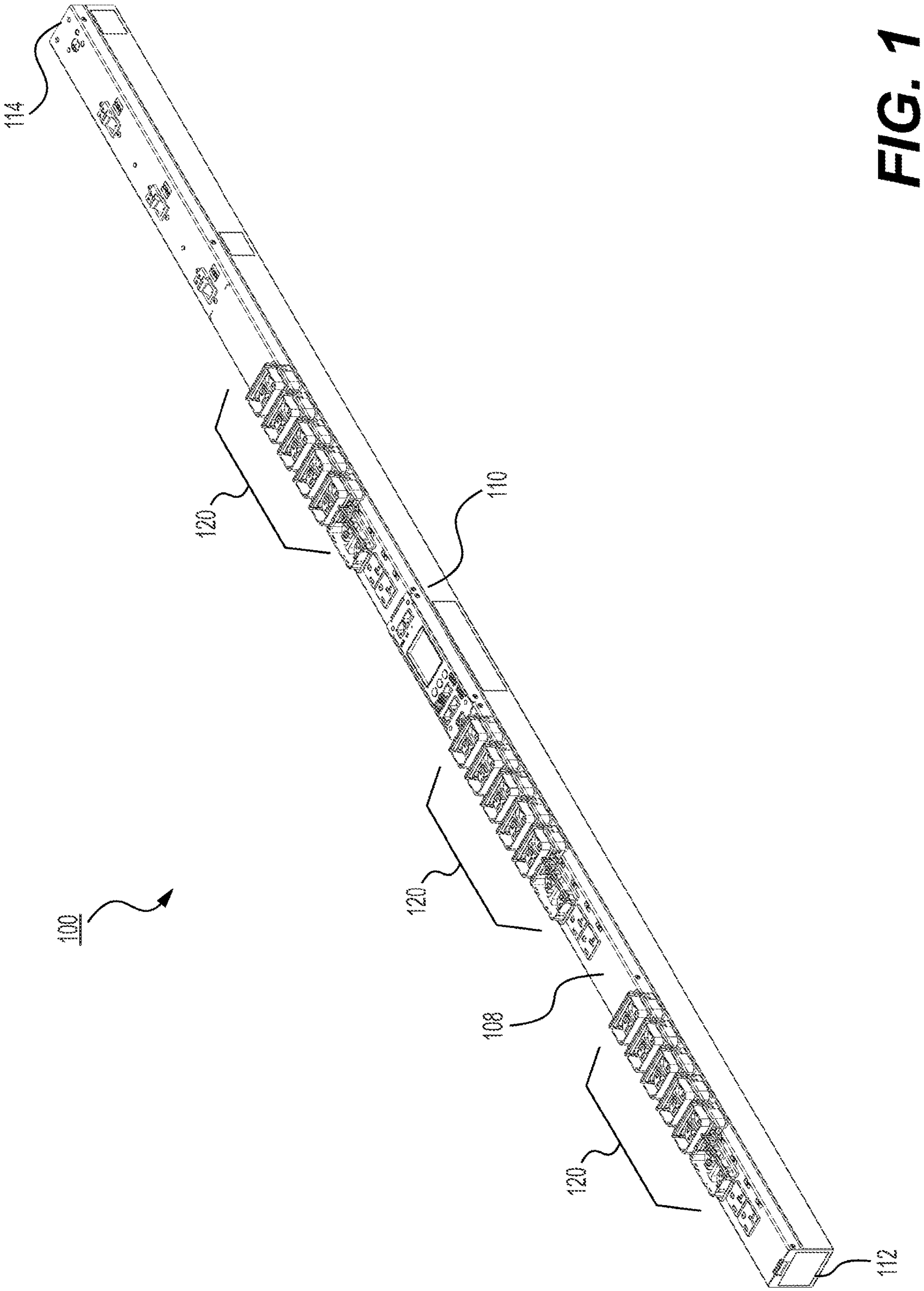
FIG. 1 shows a perspective view of an example power distribution unit, according to an example embodiment.

Turning to the drawings, FIG. 1 shows a perspective view of an example power distribution unit (PDU) 100. The PDU 100 can include a housing 110. The housing 110 can include an upper surface 108 that includes one or more apertures designed to receive one or more receptacle modules 120. The PDU 100 can be connected to a power input via a port of the distal end 112, opposite the proximal end 114, that in turn can be connected to an external power supply (e.g., AC power). Although the housing 110 shown is substantially elongated and rectangular, other shapes and form factors may be used and example shapes are contemplated as needed or required.

Figure 2:
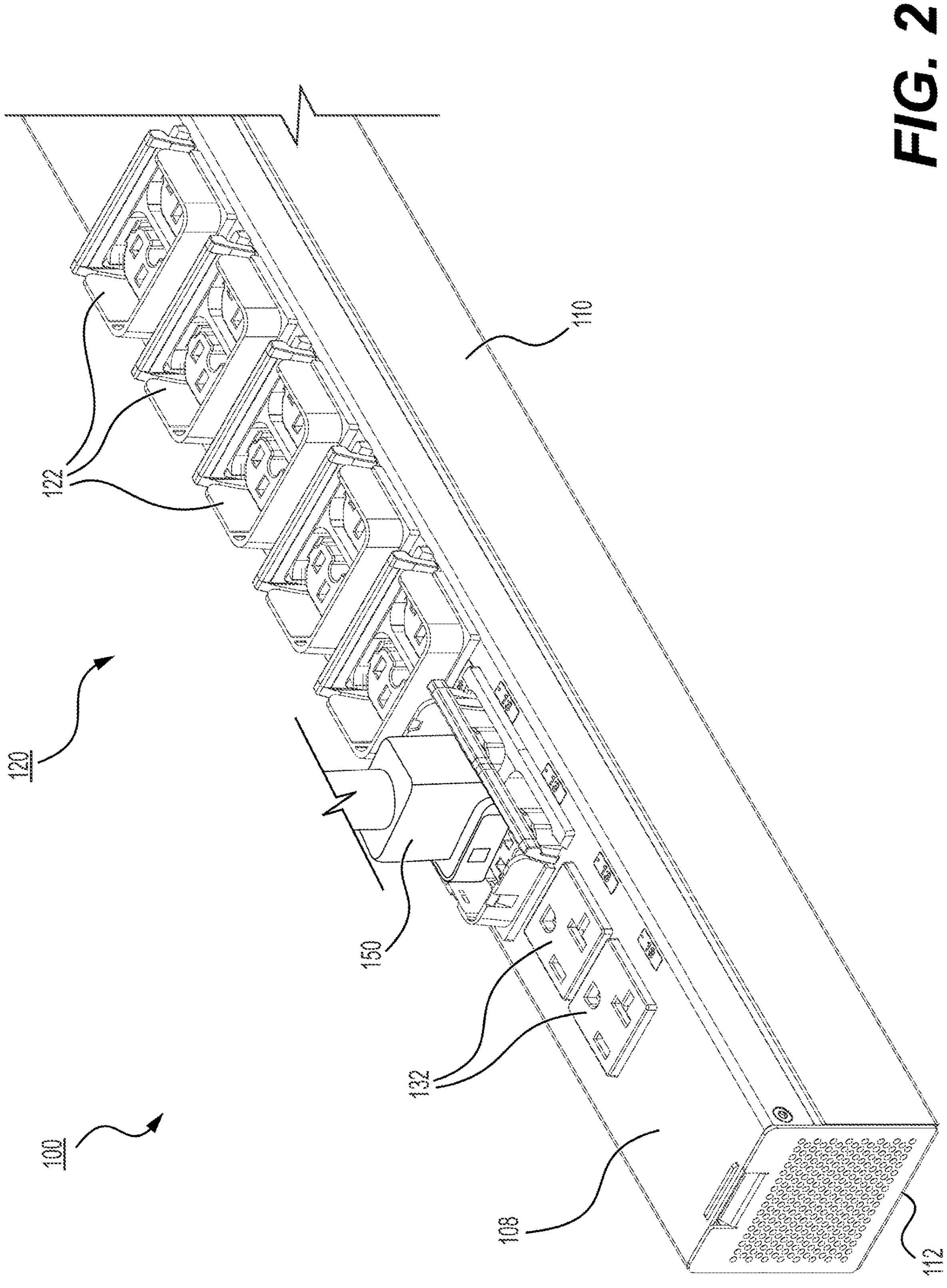
FIG. 2 shows a close-up perspective view of an example receptacle module of the power distribution unit of FIG. 1, according to an example embodiment.

FIG. 2 shows a close-up perspective view of an outlet module 120 of the PDU 100 of FIG. 1. As can be seen, the module 120 can include one or more outlet cores 132 as well as electrical receptacles 122 which can be removably attached to one or more corresponding apertures of the upper surface 108 of the housing 110. Strictly for illustrated purposes, FIG. 2 shows an example electrical plug 150 electrically connected with an example receptacle 122. Each of the other receptacles 122 and cores 132 can also receive electrical plugs during operation. Each of the receptacles 122 and/or cores 132 can include apertures and terminals for one or more connector types (e.g., C13/C14, C14/C15, C19/C20, C20/C21, etc.) as well as a second connector type (e.g., C19/C20). The receptacle 122 can include combination cores (e.g., configured to connect with combo C13/C19) or standalone cores (e.g., only C13, only C19, only C15, only C21, etc.). Although examples of this disclosure are shown and described with certain connector arrangement(s), other connector(s) are also contemplated for use with the receptacles 122 and/or cores 132, including but not limited to C2, C4, C6, C8, C10, C12, C16, C16A, C18, C22, C24, and the like.

Figure 3A:
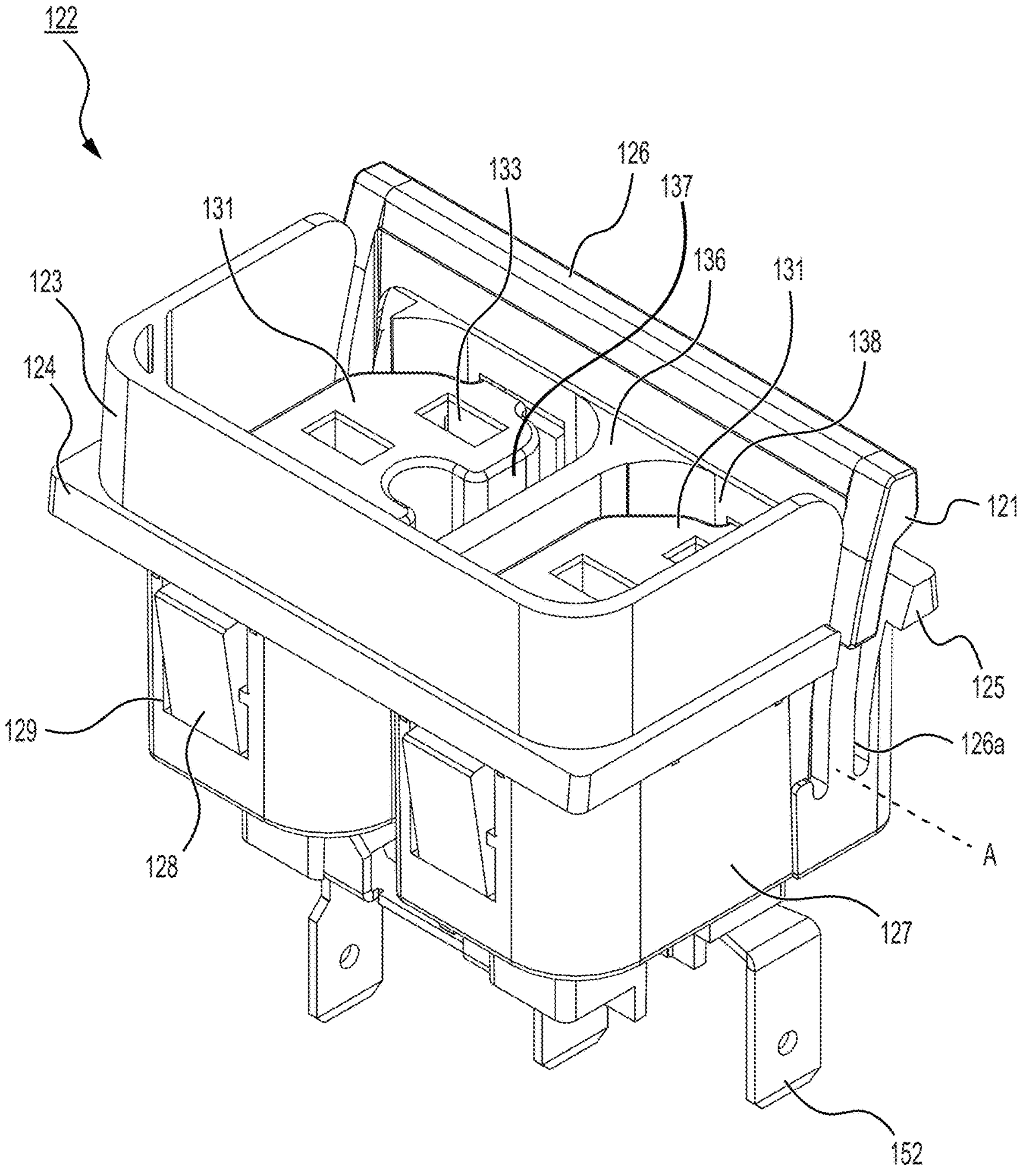
FIG. 3A shows an upper perspective view of an example receptacle, according to an example embodiment.
Figure 3B:
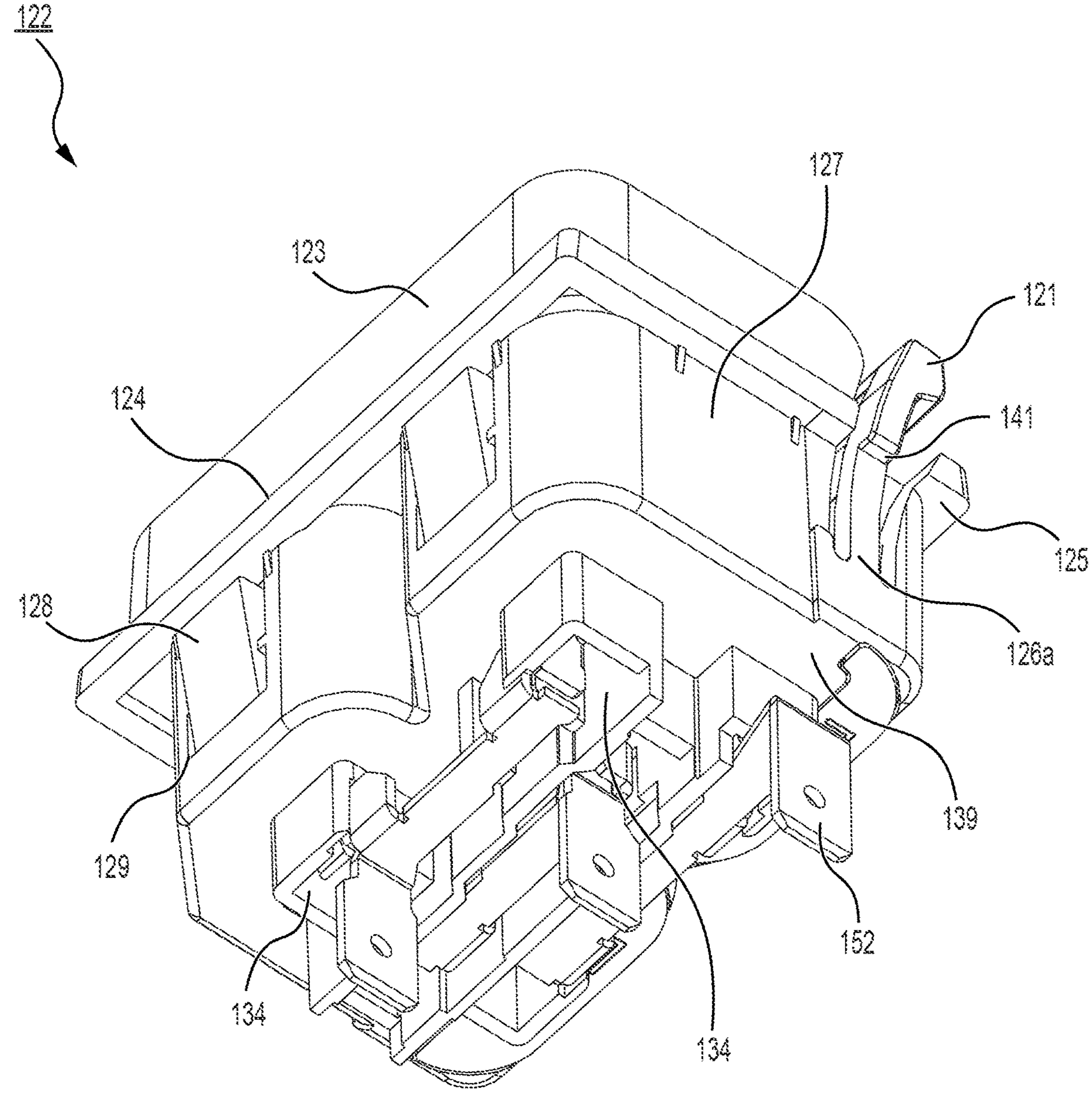
FIG. 3B shows a lower perspective of the receptacle of FIG. 3A, according to an example embodiment.
Figure 4A:
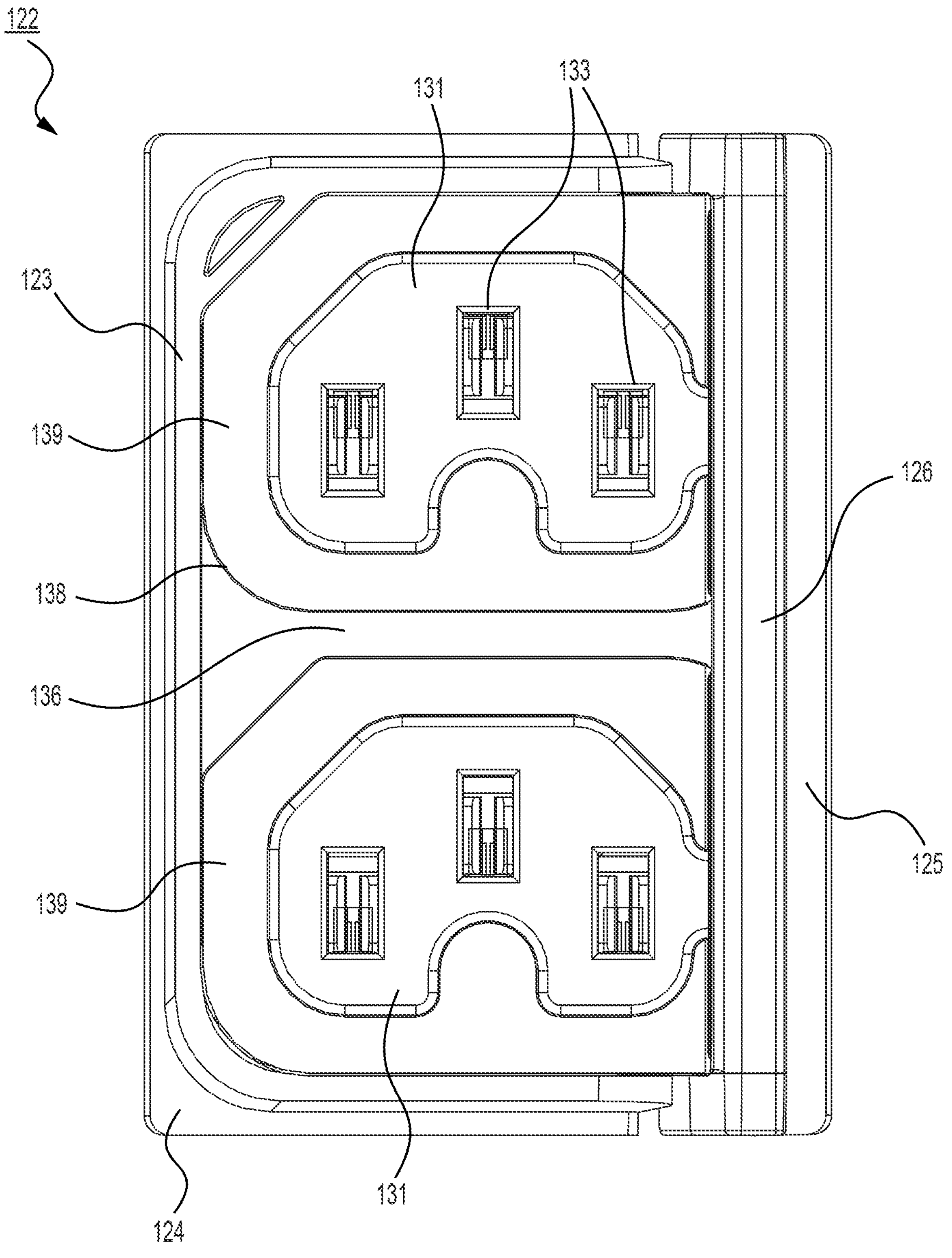
FIG. 4A shows a top plan view of the example receptacle of FIG. 3A, according to an example embodiment.
Figure 4B:
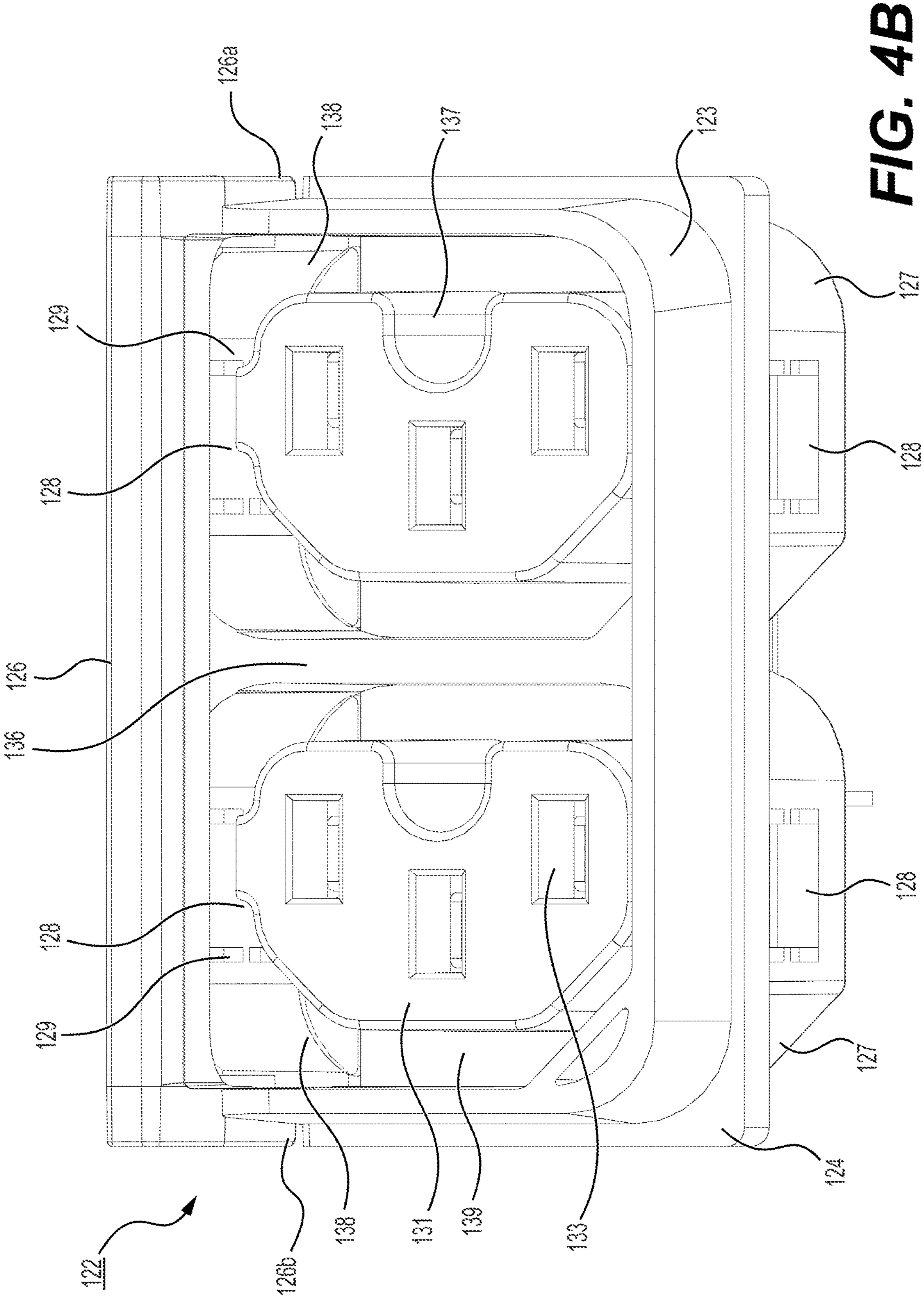
FIG. 4B shows a top perspective view of the receptacle of FIG. 3A, according to an example embodiment.
Figure 5A:
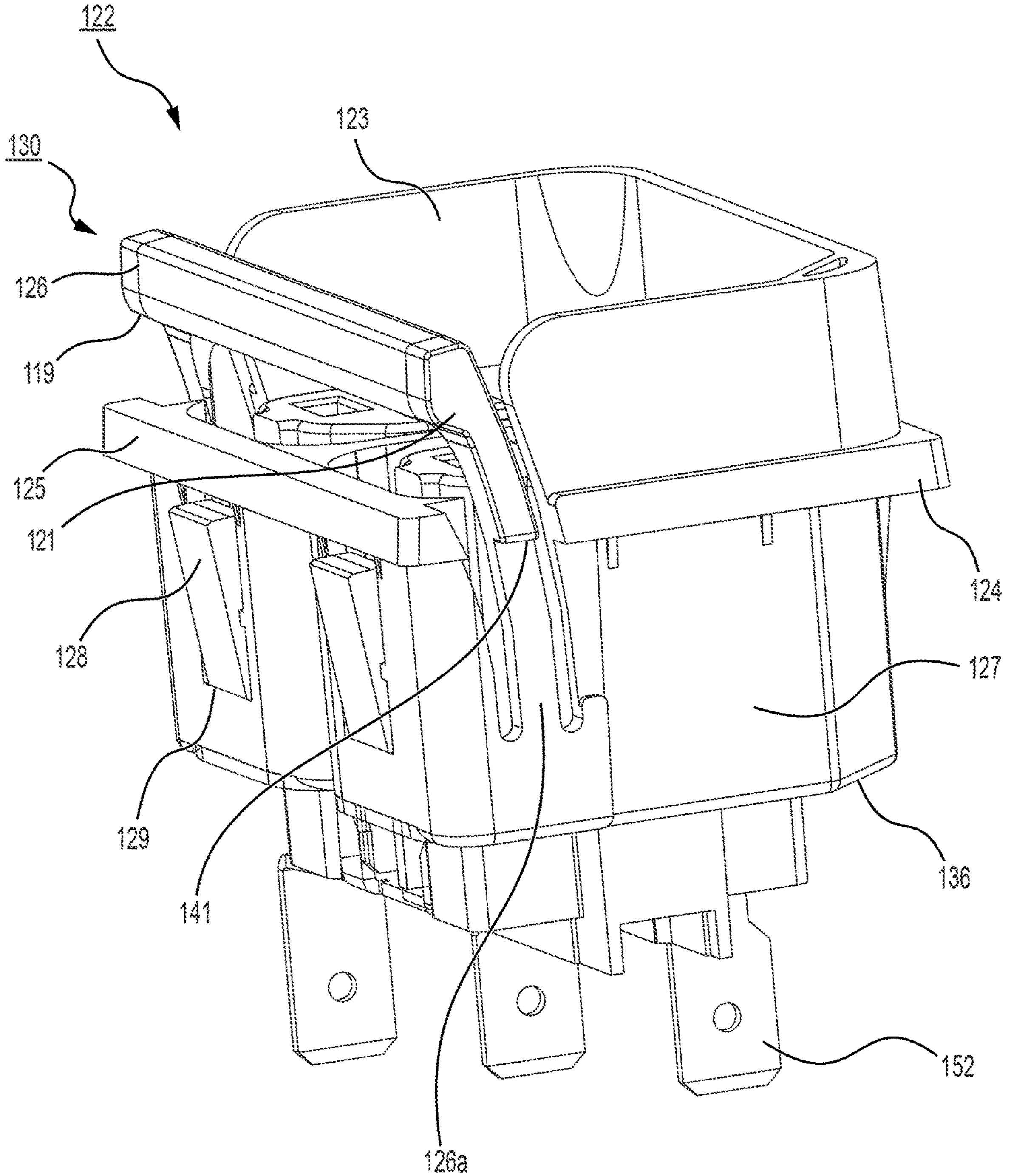
FIG. 5A shows a rear upper perspective view of another example receptacle, according to an example embodiment.
Figure 5B:
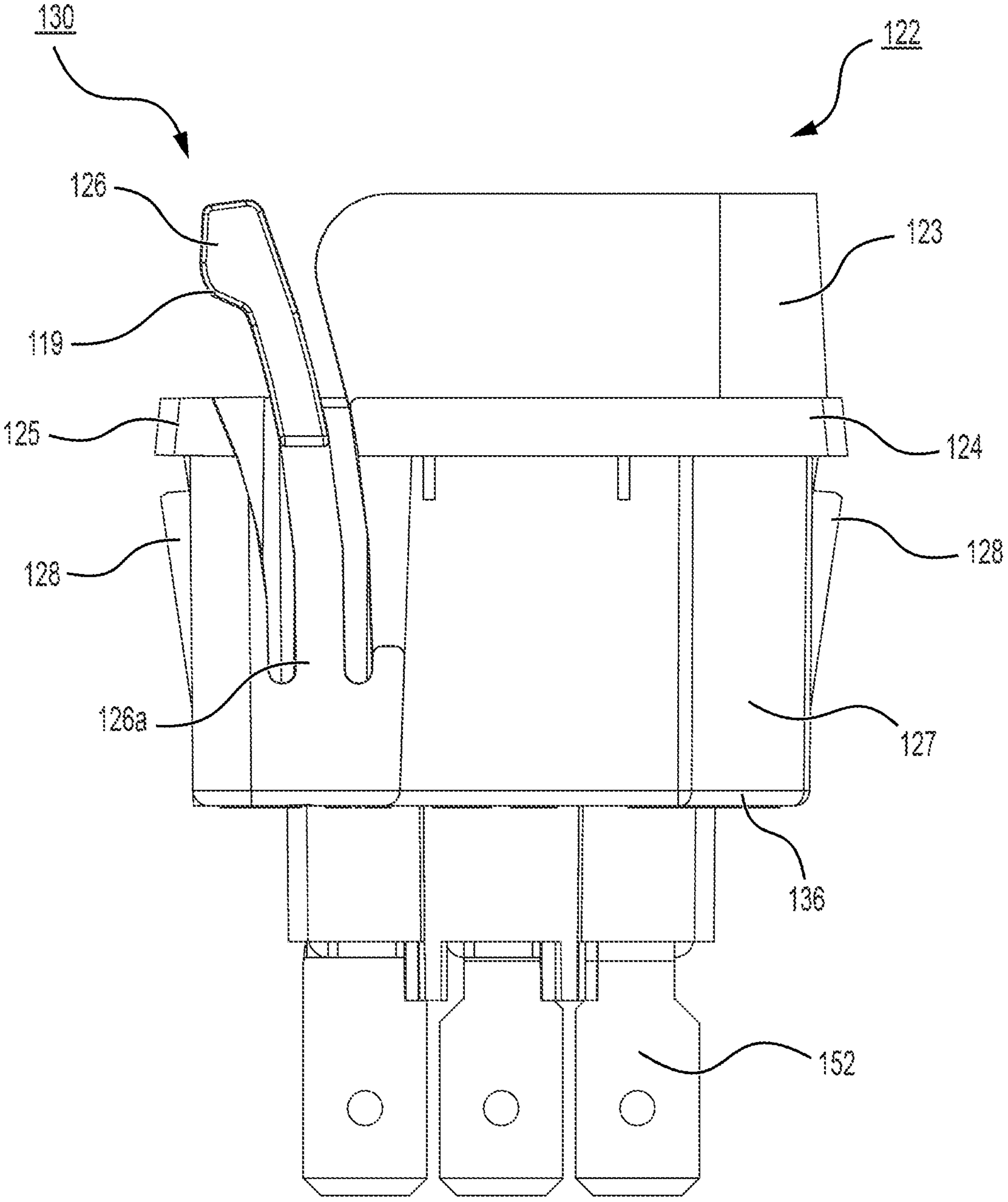
FIG. 5B shows a side view of the receptacle of FIG. 5A, according to an example embodiment.

FIG. 3A shows an upper perspective view of the receptacle 122. FIG. 3B shows a lower perspective of the receptacle 122. FIG. 4A shows a top plan view of the receptacle 122 while FIG. 4B shows a top perspective view of the receptacle 122. FIG. 5A shows a rear upper perspective view of receptacle 122 while FIG. 5B shows a side view of the receptacle 122. As shown in FIGS. 3A to 5B, the receptacle 122 can include a base surface 139. One or more inner cores 131 can be extended from the base surface 139 and include an outer surface 137 configured to mate with a connector type (e.g., C13/C14). An isolation wall 136 can be extended upwards from the base surface 139 between adjacent cores 131. The isolation wall 136 can be formed with the outer wall 123 and/or detachable thereto. The outer wall 123 can be positioned around the one or more inner cores 131. Although FIGS. 3A to 5B show an example with two cores 131, it is understood that fewer cores (e.g., only one core as in FIGS. 7A to 7B) or more than two cores 131 can be included in a receptacle as needed or required. The outer wall 123 can include an inner surface 138 configured in the shape of a receptacle shroud to receive a connector type (e.g., C19/C20). A plurality of terminals 152 can be positioned each with a respective aperture 133 of respective core 131. Each terminal 152 can extend from a lower opening 134 of the respective aperture 133 and terminate in a connection end configured to configured to electrically connect to a circuit board within the housing 110. In some aspects, the plurality of terminals 152 can instead and/or in addition be electrically connected to discrete internal power wiring of the housing 110. In some aspects, each terminal 152 can include one or more conductive materials. In some aspects, each terminal 152 can include quick-disconnect tabs.

The outer wall 123 can include a first end 126*a* and a second end 126*b* each positioned on a common side. Receptacle 122 can be a single molded piece in some aspects and/or include one or more aspects or features thereof detachable to aspects such as the base surface 139, core 131, and/or wall 123. The receptacle 122 can include a locking mechanism 130 that is configured to flex and allow the plug 150 to connect to the core 131 while locking a shoulder of the plug 150 in place.

In some aspects, the locking mechanism 130 can be an integrated, molded, automatic latching system that is configured to prevent power cords (e.g., plug 150) from being accidentally pulled out of the receptacle 122 while also providing simple plug removal when desired. In some aspects, as the plug 150 is pushed down into the receptacle 122, the plug 150 can engage electrical contacts of the core 131 while and the locking mechanism 130 snaps over the shoulder of the plug 150 housing. As shown, the locking mechanism 130 can extend between the first end 126*a* and the second end 126*b*. The locking mechanism 130 can include a locking catch arm 126 that is configured to pivot about a common axis A of ends 126*a*, 126*b* and engage with a shoulder of an electrical plug (e.g., plug 150) when connected to core 131. The arm 126 can include a substantially planar upper surface and an angled inner surface extended below the upper surface towards ends 126*a*, 126*b*. The angled inner surface can be configured to guide the shoulder of the plug 150 and cause the shoulder to flex outwardly but then bias back to retain the shoulder once the plug 150 is inserted and below arm 126.

The arm 126 can include a lower catch edge 119 and can extend as a cross-beam or link between a first spring arm 121 and second spring arm 121. Each spring arm 121 can extend from respective ends 126*a*, 126*b* to arm 126. In some aspects, each spring arm 121 can be pivotably connected or otherwise pivotally arranged (e.g., formed therewith) so as to be biased and pivot about the common axis A. In operation, the edge 119 of the arm 126 can be preloaded when a plug 150 is installed to the extend the edge 119 can engaged the shoulder of the plug 150 to lock it in place. In some aspects, the arms 121 can include a spring, a resilient member, and/or be formed with a bias so as to be oriented to rest against or biased towards the flange 124 in a resting state. In some aspects, the arms 121 can extend along an outer surface of respective ends 126*a*, 126*b* (e.g., at least partially along the outer surface of the lower portion 127 of the outer wall 123).

The first flange 124 of the receptacle 122 can separate the upper and lower portions of the outer wall 123 and at least partially around the outer wall 123. In some aspects, the first flange 124 can extend at least around a rear face opposite the locking mechanism 130 and at least partially along lateral sides between the rear face and the opposite forward face of the locking mechanism 130. In some aspects, the first flange 124 can extend up to (e.g., so as to be co-planar with) or otherwise adjacent a plan of ends 126*a*, 126*b*. A second flange 125 can extend along the opposite forward face of receptacle 122. In some aspects, the arm 126 can be cantilevered over the second flange 125 and be configured to pivot about common axis A and movable over the second flange 125 when the plug 150 is being inserted therewith. In some aspects, each of the arms 121 may extend substantially upward from respective ends 126*a*, 126*b* to being above the flanges 124, 125. As can be seen, a break or gap can be positioned between the flanges 124, 125 through which each of arms 121 can extend. In some aspects, one or both arms 121 can include a retention edge 141 to securely attach the receptacle 122 to the upper surface 108 of the housing 110 (e.g., to an edge of an aperture of the upper surface 108 in which the receptacle 122 is positioned when attached thereto).

In some aspects, one or more movable housing latches 128 can be below flange 124 and/or 125. The one or more latch 128 can be formed or otherwise positioned with wall 127 (e.g., within at least partial cutout 129 of wall 127). The latch 128 can include an angled, movable surface that is configured to guide the outer surface of the wall 127 in position with respect to the upper surface 108 of the housing 110 when being connected to an aperture thereof. In some aspects, the latch 128 can extend outward and away from the wall 127 so as to have a wider footprint than the rest of the wall 127. As a result, during connection with the upper surface 108 and as the receptacle 122 is being inserted, the angled latch 128 extending outward can first contact the inner edge of the aperture of the upper surface 108 and cause the latch 128 to move inwardly with respect to cutout 129 until the aperture of the upper surface 108 is positioned above the uppermost edge of the latch 128. In some aspects, the latch 128 can click or otherwise snap back once the upper surface is retained above the latch 128 and below the flanges 124 and/or 125.

Figure 6A:
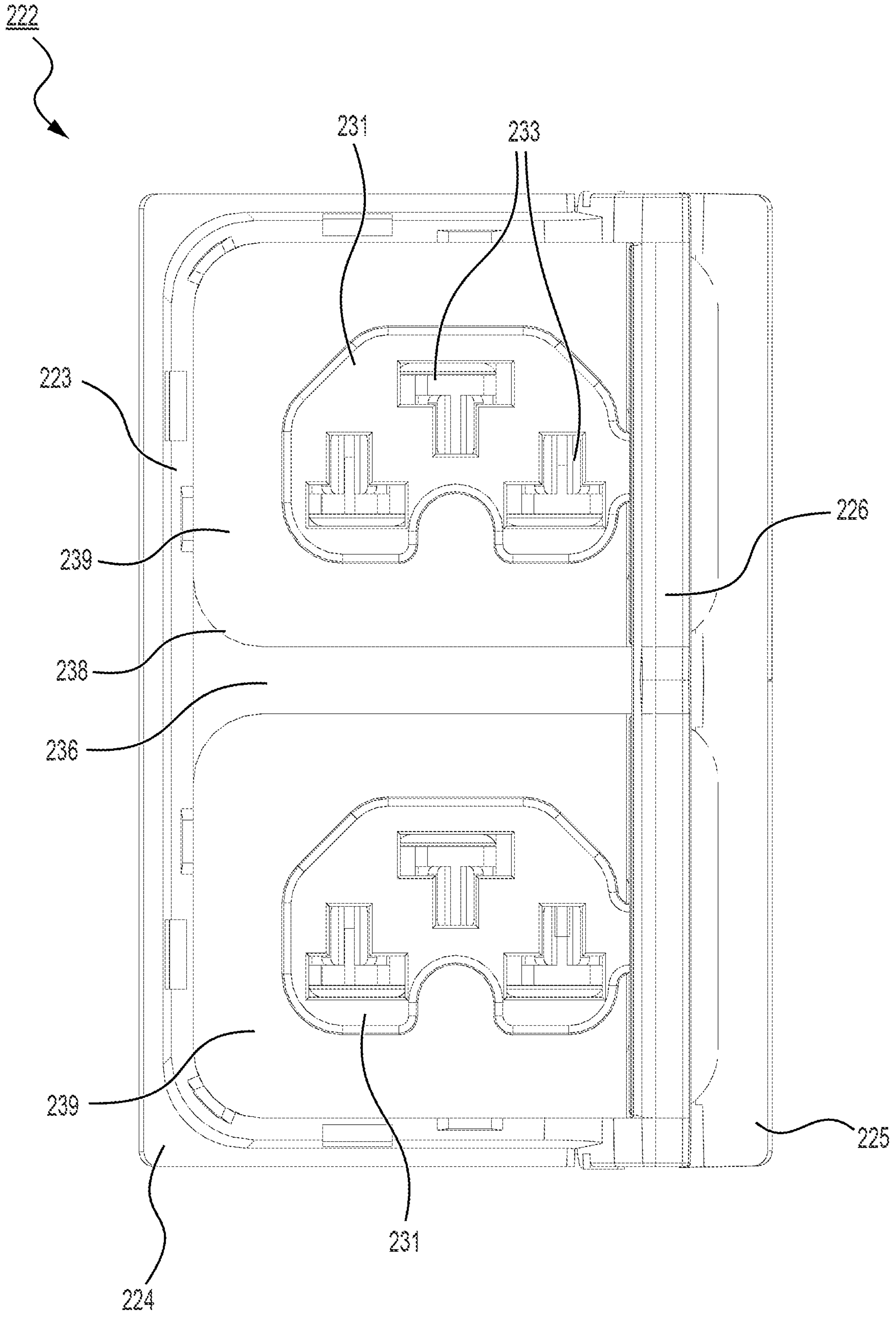
FIG. 6A shows a top plan view of an example receptacle, according to an example embodiment.
Figure 6B:
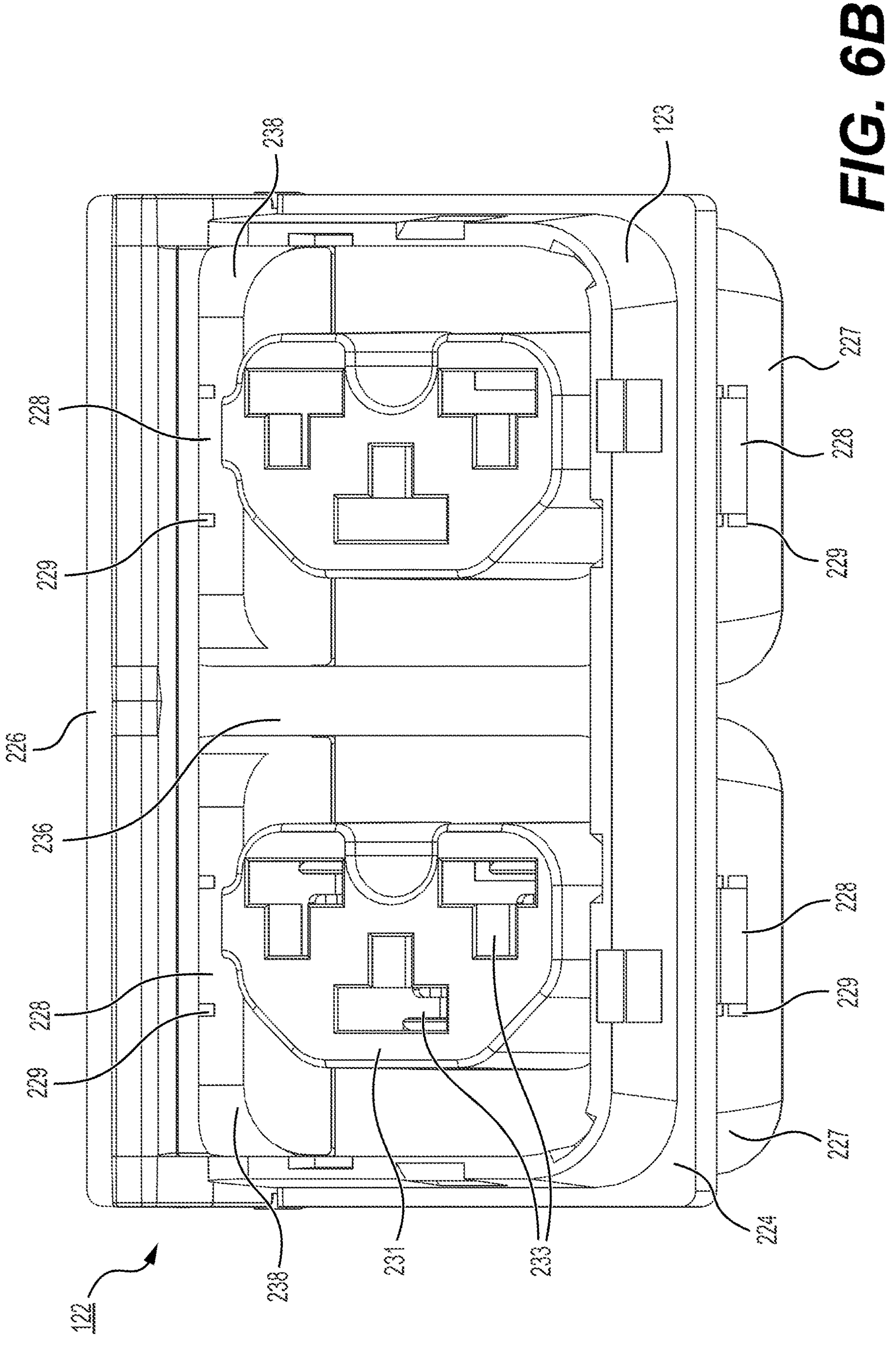
FIG. 6B shows a top perspective view of the receptacle of FIG. 6A, according to an example embodiment.

FIG. 6A shows top plan view of an example receptacle 222, according to an example embodiment. It is noted that like numerals of the receptacle 222 indicate like structural elements and features in various figures. FIG. 6B shows an upper perspective view of the receptacle 222. As can be seen, the depicted receptacle 222 can include apertures and terminals for multiple connector types (e.g., C14 and C20). In the depicted example of FIGS. 6A and 6B, the apertures 233 of each core 231 can be T-shaped so as to be configured to accept the terminals of at least two different connector types. For example, the apertures 233 can electrically connect with a C20 plug and a C14 plug.

Figure 7A:
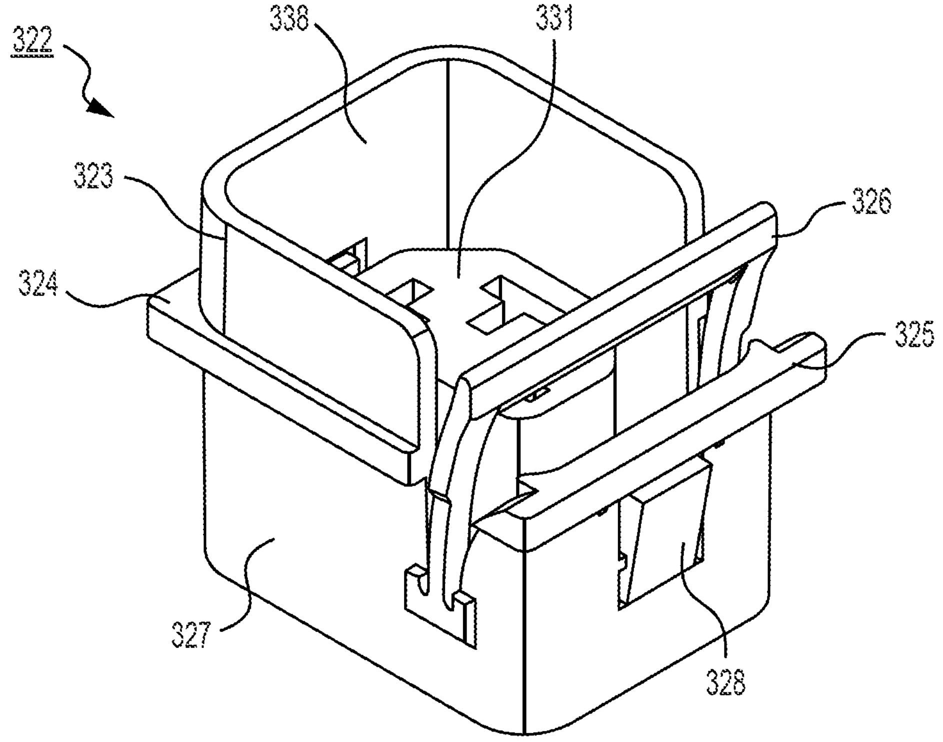
FIG. 7A shows an upper perspective view of another example receptacle, according to an example embodiment.
Figure 7B:
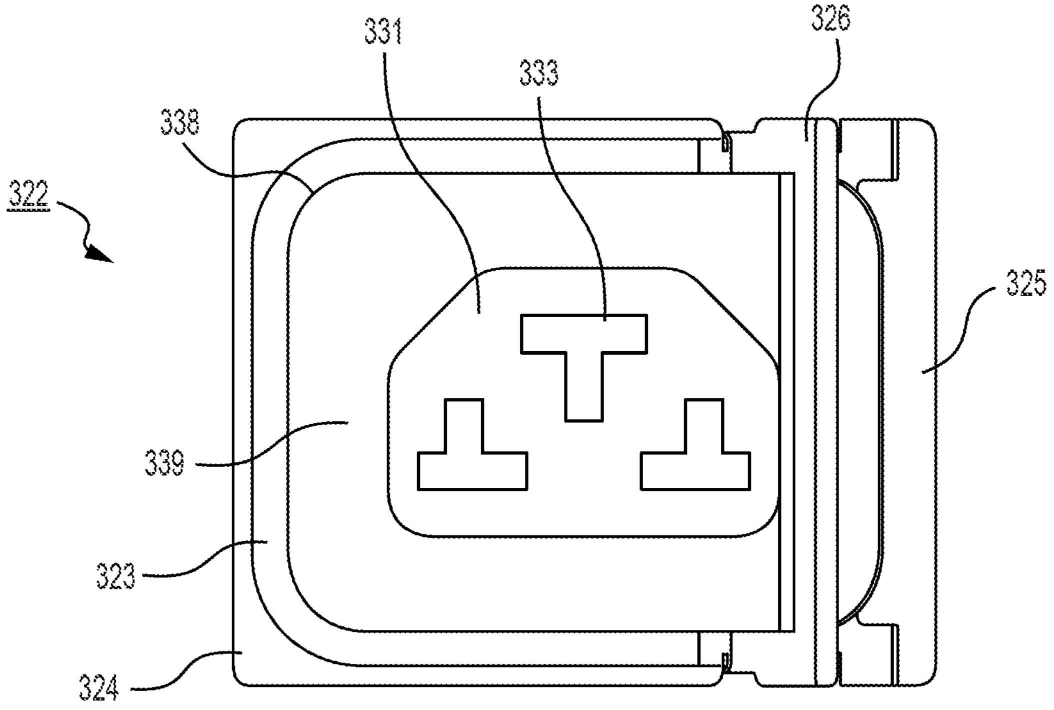
FIG. 7B shows a side view of the receptacle of FIG. 7A, according to an example embodiment.

FIG. 7A shows upper perspective view of an example receptacle 322, according to an example embodiment. It is noted that like numerals of the receptacle 322 indicate like structural elements and features in various figures. FIG. 7B shows a top plan view of the receptacle 322. As can be seen and similar to FIGS. 6A to 6B, the depicted receptacle 322 can include apertures and terminals for multiple connector types (e.g., T-shaped so as to electrically connect with both C14 and C20). In the depicted example of FIGS. 7A and 7B, the receptacle 322 only has a single core 331 merely for illustration and without limitation.

Figure 8A:
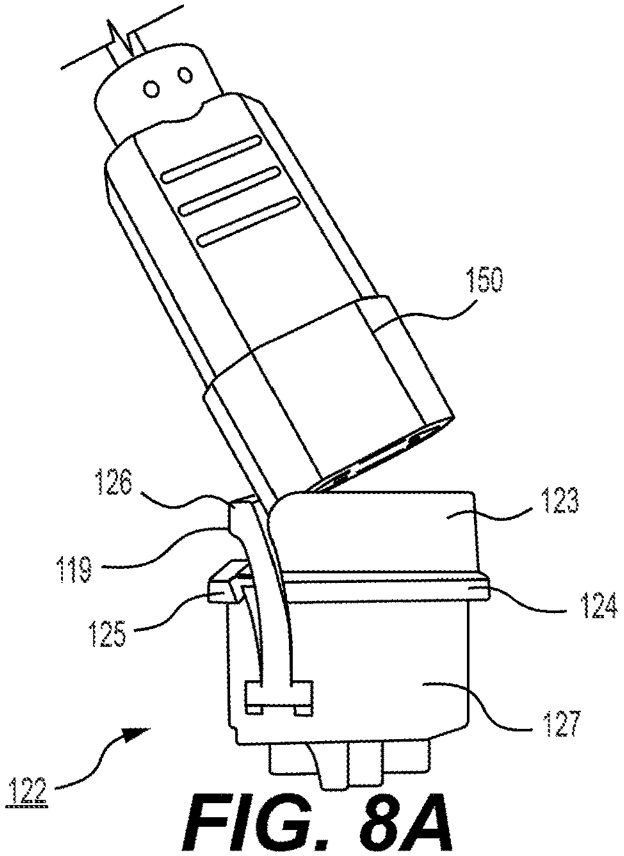
FIG. 8A shows a step of a process of using an example receptacle with a plug of a power cord, according to an example embodiment.
Figure 8B:
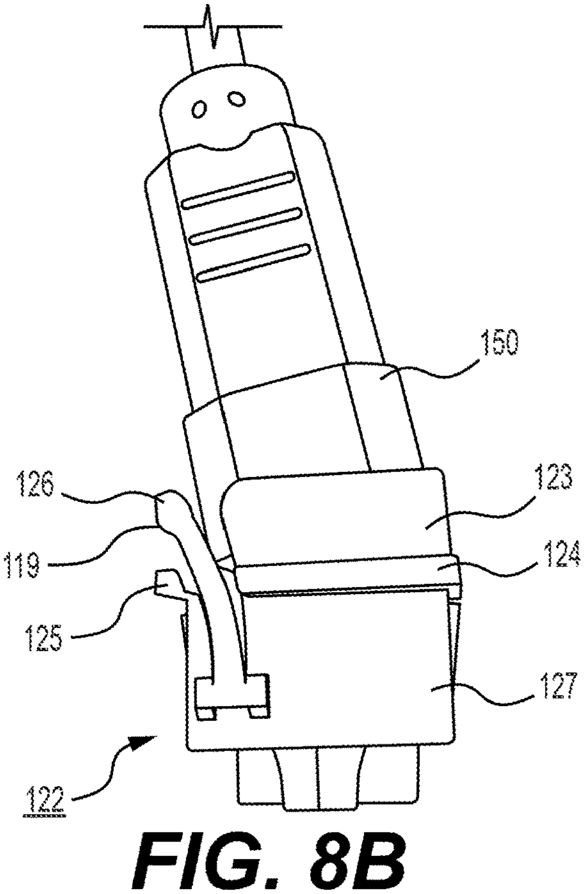
FIG. 8B shows another step of the process of FIG. 8A, according to an example embodiment.
Figure 8C:
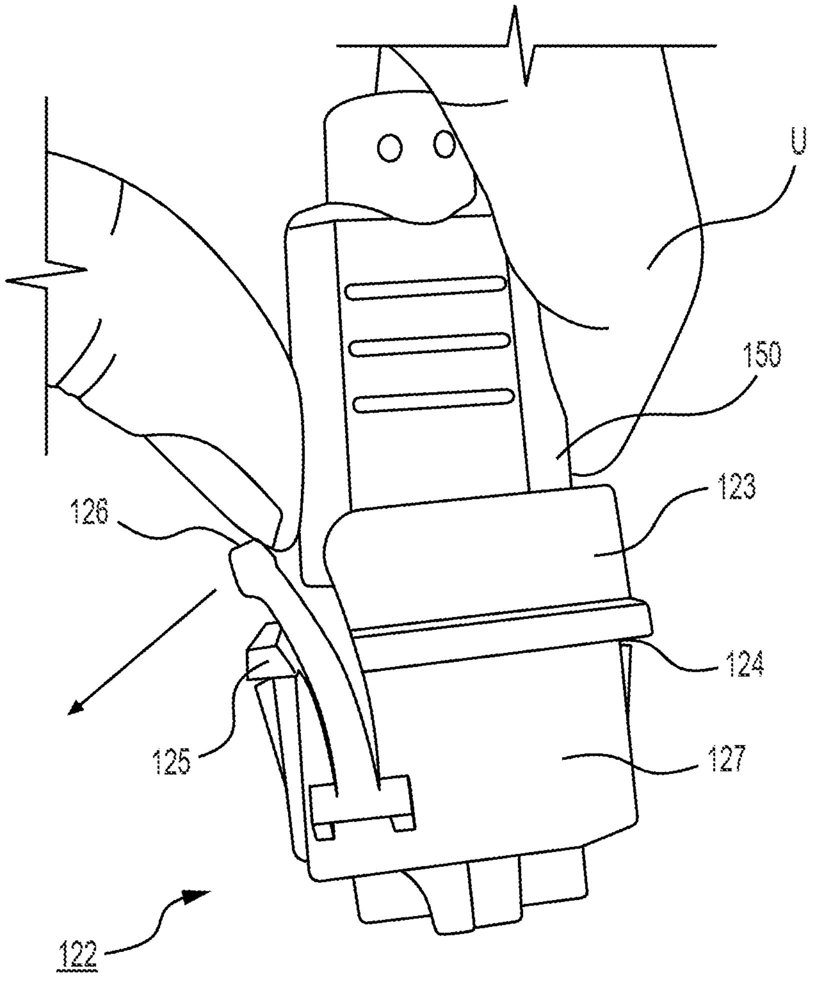
FIG. 8C shows another step of the process of FIG. 8A, according to an example embodiment.

FIGS. 8A to 8C show steps of a process of using the previously described receptacle 122 with a plug 150. In the step of FIG. 8A, the housing of the plug 150 pushes into the arm 126 of the locking mechanism 130 causing the arm 126 to pivot about the axis A and flex and allow the plug 150 to pass. FIG. 8B shows the plug 150 shoulder locked by the arm 126 so that the arm 126 is in an extended-most state. It can be seen that arm 126 has now pivoted about the axis A so that aspects of the arm 126 are directly above the flange 125 while the shoulder of the plug 150 is securely engaged by the edge 119 therebelow (e.g., by the bias imparted by the spring arms 121 to the edge 119 of the arm 126 onto the shoulder of the plug 150). In the step of FIG. 8C, the locking mechanism 130 can be disengaged so as to allow removal of the plug 150 by pushing on the upper surface of the arm 126 (e.g., with a finger of the user U as shown) and pivoting the arm 126 away from the shoulder of the plug 150. Once disengaged, the plug 150 can be withdrawn from the locking mechanism 130 and the receptacle 122 altogether.

Figure 9A:
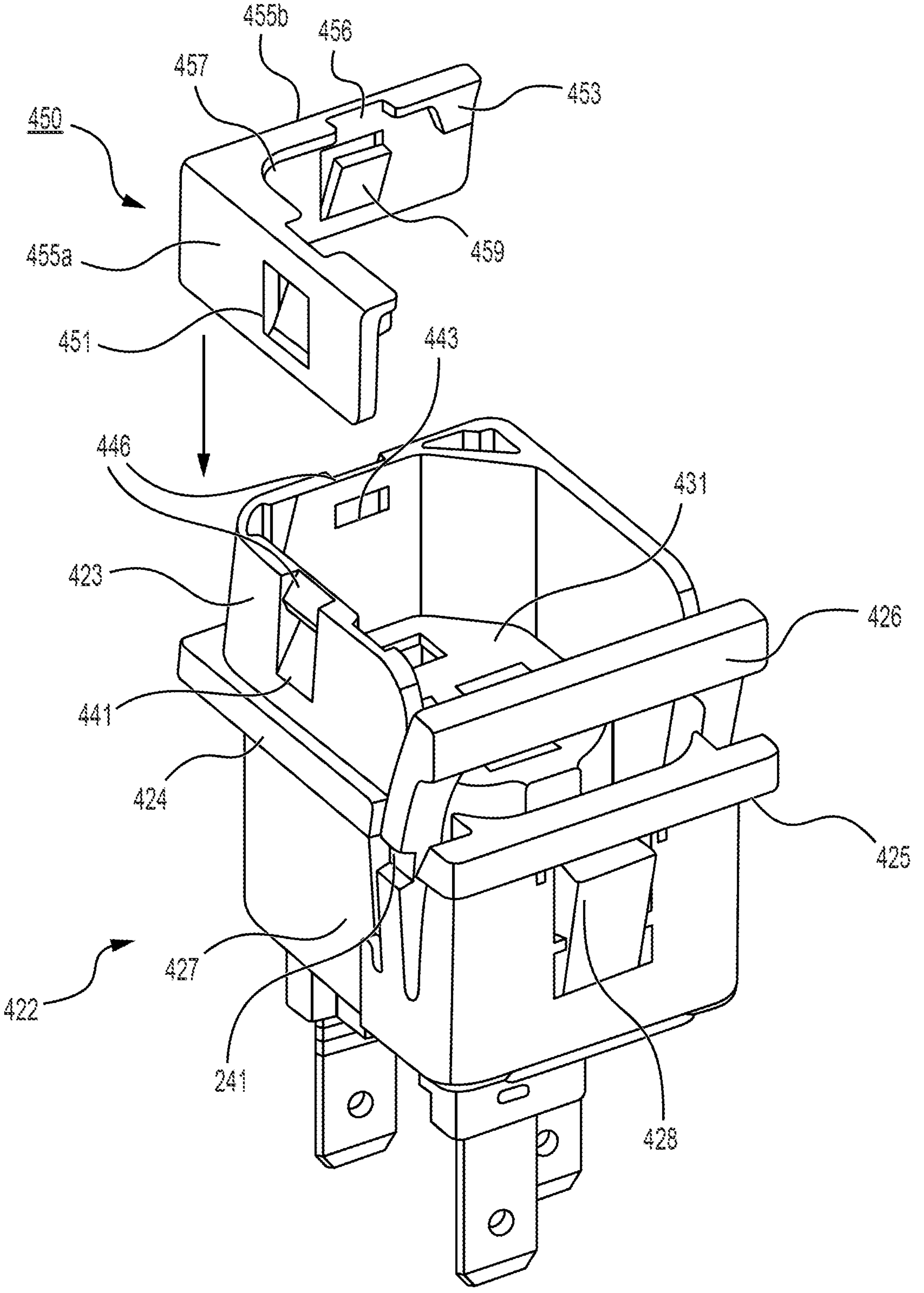
FIG. 9A shows an upper exploded perspective view of an example receptacle with a bezel, according to an example embodiment.
Figure 9B:
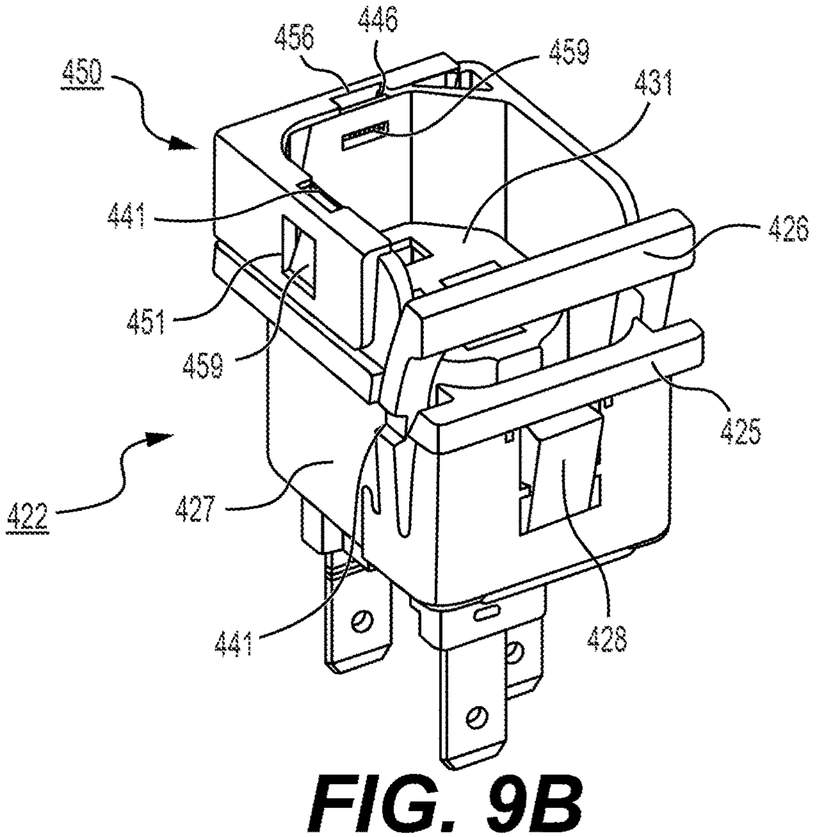
FIG. 9B shows an upper perspective view of the receptacle of FIG. 9A in an assembled state, according to an example embodiment.
Figure 9C:
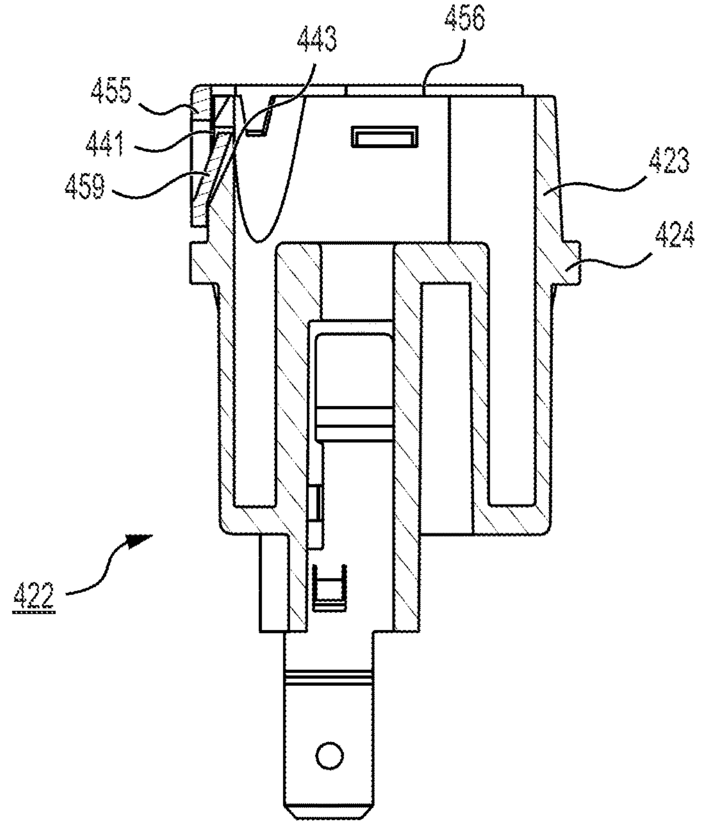
FIG. 9C shows a side cross-section view of the receptacle of FIG. 9B, according to an example embodiment.

FIG. 9A shows an upper exploded perspective view of an example receptacle 422 with a bezel 450, according to an example embodiment. It is noted that like numerals of the receptacle 422 indicate like structural elements and features in various figures. FIG. 9B shows an upper perspective view of the receptacle 422 in an assembled state with the bezel 450. FIG. 9C shows a side cross-section view of the receptacle of the assembled receptacle 422 of FIG. 9B. In some aspects, the receptacle at least one notched window 441 can be in the upper portion of the outer wall 423. The window 441 can be configured to receive a bezel 450. The bezel 450 can include a label display. For example, the bezel 450 can be colorized, whereby the color(s) associated therewith can be indicative of related receptacle and/or connector parameters. The bezel 450 can include a first edge 455*a* orthogonal with respect to a second edge 455*b*. The bezel 450 can include at least one inwardly angled connector 459 configured to snap on and attach with the at least notched window 441. For example, the window 441 can be angled from the outer surface of the wall 423 to the inner surface thereof, whereby the angled surface can guide the connector 459 until snapping into the window opening 443 of the window 441. The window 441 can include an upper angle catch edge configured to ensure that connector 459 is securely guided therealong and through opening 443.

The connector 459 can be a flexible, biased element that is formed extending inwardly from cutout 451 of edge 455*a*. In some aspects, the bezel 450 can include connectors 459 on each edge 455*a*, 455*b*. The bezel 450 can include at least one alignment tab 453 configured to removably guide attachment of the bezel 450 to an upper edge of the upper portion of the outer wall 423. The alignment tab 453 can extend inward (e.g., be cantilevered) from an upper planar surface of the bezel 450 and extend downward therefrom so as to create a space or groove that snugly fits over the upper edge of the wall 423.

In some aspects, a plurality of bezels 450 can be included in a kit with one or more receptacles 422. Each of the bezels 450, wherein each bezel of the kit can include a different visual and/or tactile identifier, each different visual and/or tactile identifier including at least one of an identifying color, label, molded shape, motif, and character. In some aspects, the bezel 450 can also include numeric or other text-based label to further distinguish or identify individual receptacles. The desired label text can also be molded, stamped, painted, silk screened, or otherwise put onto the bezel part itself. In some aspects, the bezel 450 can be attached using mechanical hardware, adhesive, ultrasonic welding, or other joining method, and could be designed to attach to any portion of the receptacle 422 or locking mechanism 430. The bezel 450 can also be made of anodized or painted metal or other colorized material.

While certain embodiments of the present disclosure have been described in connection with what is presently considered to be the most practical and various embodiments, it is to be understood that the present disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the present disclosure, including the best mode, and also to enable any person skilled in the art to practice certain embodiments of the present disclosure, including making and using any devices or systems and performing any incorporated methods. The patentable scope of certain embodiments of the present disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power distribution unit, comprising:

a housing; and at least one electrical receptacle removably attached to the housing, the at least one electrical receptacle comprising:

a base surface;

an inner core extended from the base surface and comprising an outer surface configured to mate with a first connector type;

an outer wall positioned around the inner core, the outer wall comprising an inner surface configured to receive a connector type, the outer wall comprising first and second ends; and a locking mechanism comprising:

a locking catch arm extending between the first and second ends above a flange that at least partially surrounds the outer wall and configured to pivot about a common axis of the first and second ends and engage with a shoulder of an electrical plug when connected to the inner core;

a first spring arm pivotably connected to the common axis and extended from the locking catch arm to the common axis along the outer surface of the first end; and a second spring arm pivotably connected to the common axis and extended from the locking catch arm to the common axis along the outer surface of the second end;

wherein the flange comprises a rear portion with a break between a forward portion, the first and second spring arms each extended through the break between the rear and forward portions of the flange.

2. The power distribution unit of claim 1, wherein each spring arm comprises a retention edge extended radially outward to securely attach the at least one electrical receptacle to an upper surface of the housing.

3. The power distribution unit of claim 1, wherein the base surface, the inner core, and the outer wall are formed together as a single molded piece.

4. The power distribution unit of claim 1, wherein the inner core comprises an upper surface with a plurality of apertures configured to receive the electrical plug.

5. The power distribution unit of claim 4, further comprising:

a plurality of terminals each electrically connected to a circuit board within the housing, each terminal positioned in a corresponding one of the apertures.

6. The power distribution unit of claim 1, wherein the outer wall comprises an upper portion extended upward from the flange and a lower portion extended from the flange to the base surface, and further comprising at least one notched window in the upper portion of the outer wall, the at least one notched window configured to receive a bezel comprising a label display.

7. The power distribution unit of claim 6, wherein the bezel comprises a first edge orthogonal with respect to a second edge, the bezel comprising at least one inwardly angled connector configured to snap on and attach with the at least notched window.

8. The power distribution unit of claim 6, wherein the bezel comprises at least one alignment tab configured to removably guide attachment of the bezel to an upper edge of the upper portion of the outer wall, the at least one alignment tab downward from an upper planar surface of the bezel.

9. A kit, comprising:

the power distribution unit of claim 6, and a plurality of bezels configured to be removably attached to an upper edge of the upper portion of the outer wall and the at least one notched window, wherein each bezel comprises a different visual and/or tactile identifier, each different visual and/or tactile identifier comprising at least one of an identifying color, label, molded shape, motif, and character.

10. An electrical receptacle configured to be removably attached to a housing of a power distribution unit, the electrical receptacle comprising:

an inner core extended from a base surface and comprising an outer surface configured to mate with an electrical connector type;

an outer wall positioned around the inner core, wherein the outer wall comprising an inner surface configured to receive a connector type, the outer wall comprising first and second ends;

a locking mechanism comprising:

a locking catch arm extending between the first and second ends above a flange that at least partially surrounds the outer wall and configured to pivot about a common axis of the first and second ends and engage with a shoulder of an electrical plug when connected to the inner core;

a first spring arm pivotably connected to the common axis and extended from the locking catch arm to the common axis along the outer surface of the first end; and a second spring arm pivotably connected to the common axis and extended from the locking catch arm to the common axis along the outer surface of the second end;

wherein the flange comprises a rear portion with a break between a forward portion, the first and second spring arms each extended through the break between the rear and forward portions of the flange.

11. The electrical receptacle of claim 10, wherein each spring arm comprises a retention edge extended radially outward to securely attach the electrical receptacle to an upper surface of the housing.

12. The electrical receptacle of claim 10, wherein the outer wall comprises an upper portion extended upward from the flange and a lower portion extended from the flange to the base surface, and further comprising at least one notched window in the upper portion of the outer wall, the at least one notched window configured to receive a bezel comprising a label display.

13. The electrical receptacle of claim 12, wherein the bezel comprises a first edge orthogonal with respect to a second edge, the bezel comprising at least one inwardly angled connector configured to snap on and attach with the at least notched window.

14. The electrical receptacle of claim 12, wherein the bezel comprises at least one alignment tab configured to removably guide attachment of the bezel to an upper edge of the upper portion of the outer wall, the at least one alignment tab downward from an upper planar surface of the bezel.

15. An electrical receptacle configured to be removably attached to a housing of a power distribution unit, the electrical receptacle comprising:

a base surface;

a plurality of cores extended from the base surface and comprising an outer surface configured to mate with an electrical connector type;

an isolation wall extended upwards and away from the base surface between adjacent cores of the plurality of cores;

an outer wall positioned around the plurality of cores, the outer wall comprising an inner surface configured to receive an electrical connector type, the outer wall comprising first and second ends; and a locking mechanism extended between the first and second ends, the locking mechanism comprising a locking catch arm configured to pivot about a common axis of the first and second ends and engage with a shoulder of an electrical plug when connected to at least one core of the plurality of cores.

* * * * *